United States Patent [19]

Noguchi

[11] Patent Number: 4,706,243

[45] Date of Patent: Nov. 10, 1987

[54] SINGLE-CHANNEL-PER-CARRIER COMMUNICATION SYSTEM INCLUDING A VOICE-ACTIVATED TRANSMISSION POWER CONTROLLER

[75] Inventor: Toshitake Noguchi, Tokyo, Japan

[73] Assignee: NEC Corporation, Japan

[21] Appl. No.: 739,135

[22] Filed: May 30, 1985

[30] Foreign Application Priority Data

Jun. 1, 1984 [JP] Japan .................................. 59-112653

[51] Int. Cl.$^4$ ..................... H04J 1/00; H01Q 11/12
[52] U.S. Cl. ................................ 370/69.1; 455/116; 455/245
[58] Field of Search ................ 370/69.1, 121, 104, 370/84; 455/245, 246, 116, 79, 80

[56] References Cited

U.S. PATENT DOCUMENTS

| | | | |
|---|---|---|---|
| 4,088,956 | 5/1978 | Axman .................................. | 455/116 |
| 4,373,206 | 2/1983 | Suzuki et al. ....................... | 455/116 |
| 4,392,245 | 7/1983 | Mitama ................................ | 455/116 |
| 4,555,782 | 11/1985 | Alaria et al. ....................... | 370/104 |

OTHER PUBLICATIONS

T. Takahashi et al: "Transmission Subsystem for Spade Terminal", 2nd International Conference on Digital Satellite Communication, Paris (France), Nov. 28-30, 1972, pp. 127-143.

John G. Puente et al: "Multiple-Access Techniques for Commercial Satellites", *Proceedings of the IEEE*, vol. 59, No. 2, pp. 218-229, Feb. 1971.

C. J. Wolejsza, Jr. et al: "PSK Modems for Satellite Communications", INTELSAT/IEE International Conference on Digital Satellite Communication, pp. 127-143, Nov. 25-27, 1969.

*Primary Examiner*—Douglas W. Olms
*Assistant Examiner*—Wrtis Kuntz
*Attorney, Agent, or Firm*—Ostrolenk, Faber, Gerb & Soffen

[57] ABSTRACT

A single-channel-per-carrier multiple-access communication system including a voice-activated transmission power controller operable in the absence of voice signal input to attenuate the transmission power or modulator output signal to a predetermined level under the control of voice detector output, facilitating carrier sync recovery at the receive end and simplifying design and structure of the demodulator.

7 Claims, 15 Drawing Figures

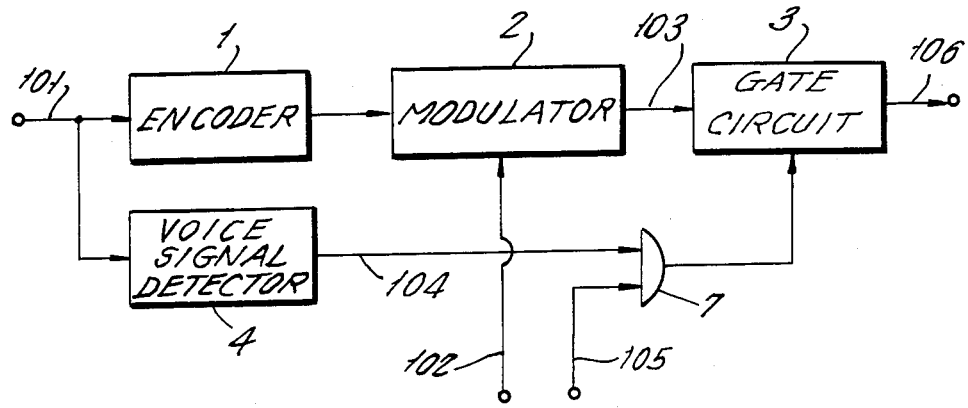
FIG. 1.
PRIOR ART
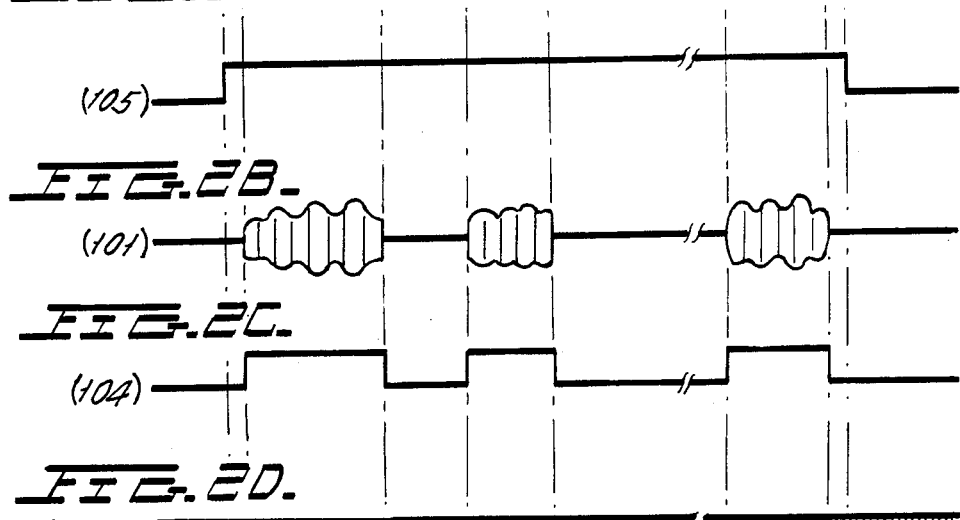
FIG. 2A.
FIG. 2B.
FIG. 2C.
FIG. 2D.
FIG. 2E.

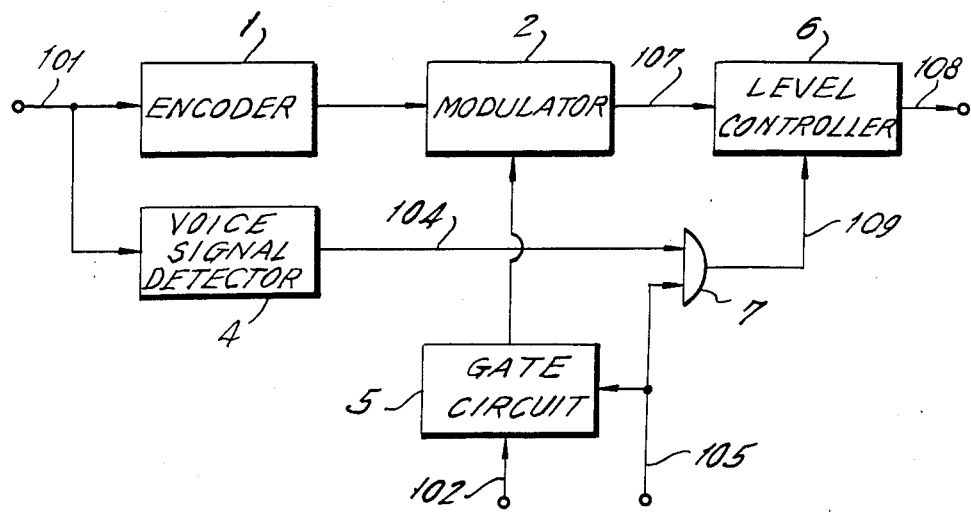
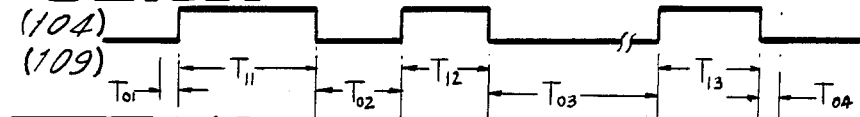
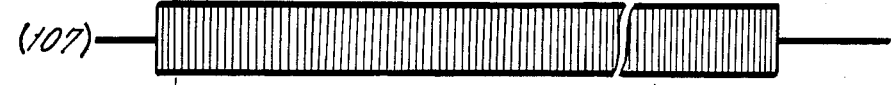
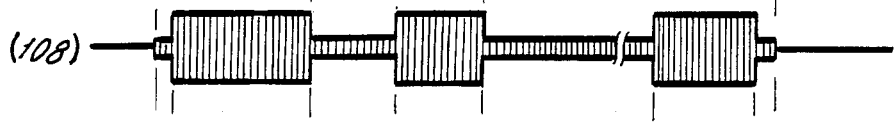

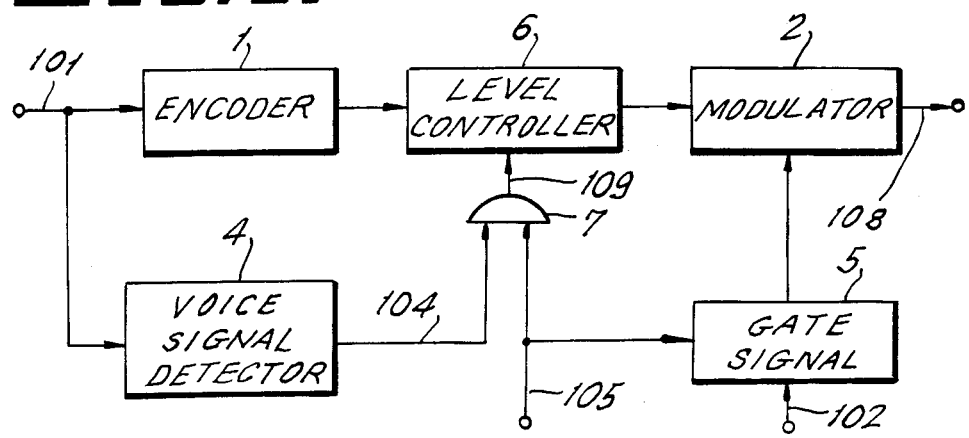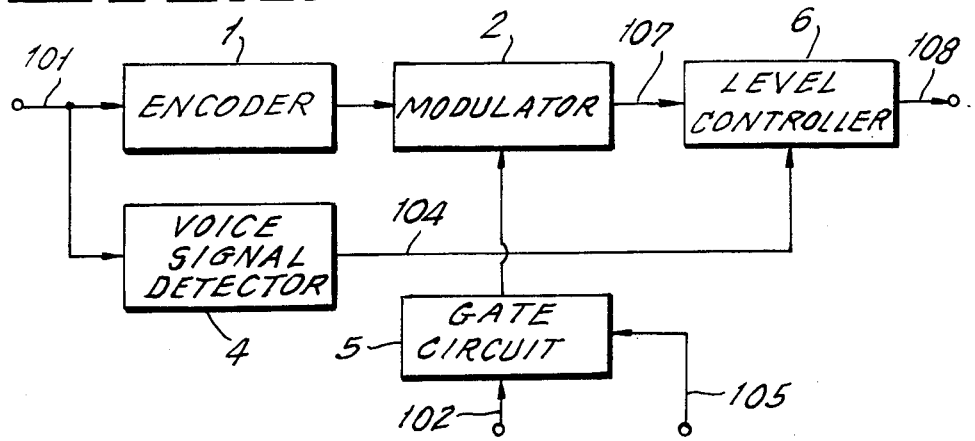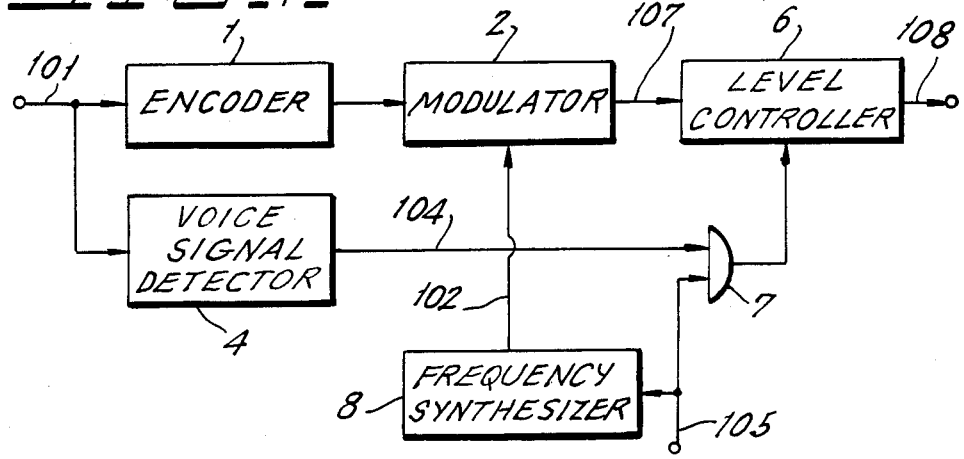

SINGLE-CHANNEL-PER-CARRIER COMMUNICATION SYSTEM INCLUDING A VOICE-ACTIVATED TRANSMISSION POWER CONTROLLER

BACKGROUND OF THE INVENTION

The present invention relates to single-channel-per-carrier (SCPC) multiple-access communication systems and more particularly to those including a voice-activated transmission power controller and usable in satellite communications.

For satellite communications, single-channel-per-carrier multiple-access communication systems (often called "SCPC" (Single-Channel-Per-Carrier) systems in the broad sense of the term) are in wide use as communication systems in which communication channels can be effectively established among a large number of earth stations. In such systems, each communication channel is served by an independent carrier for signal transmission therethrough as in the SPADE and SCPC systems. (In the latter or the SCPC system in its narrow sense, a carrier frequency is permanently assigned to each communication channel.)

In such single-channel-per-carrier multiple-access communication system, a voice activation technique is utilized to allow the transmission equipment for each communication channel to transmit carrier waves only when the channel is in connection and a voice channel signal is actually input thereto, for the purpose of minimizing power consumption of the satellite and preventing occurrence of intermodulation due to saturation of the satellite transponder. Accordingly, in the conventional system, a gate circuit has been arranged on the output side of the modulator for ON/OFF control of the modulated carrier wave and is controlled by a combination of the output of a voice signal detector, which detects the presence or absence of a voice channel signal, and the channel connection signal for connection control of the channel. Any leakage signal from such gate circuit should be minimized since it tends to adversely affect other channels as a factor causing unwanted wave radiation during nonconnection periods of the channel, (i.e., when the channel is not being utilized with no demand for communication therethrough). This not only makes the structure of the gate circuit complicated but also involves the disadvantage that, in cases where phase-shift keying digital modulation is employed as in the so called "SPADE" system, different sync systems (including carrier recovery and bit timing circuits) in the receive demodulator are complicated in design and structure since voice activation generates burst signals when the electromagnetic wave radiation disappears almost completely in the absence of voice input.

For the details of such SCPC communication system, reference may be had to:

(1) T. Takahashi et al: "TRANSMISSION SUBSYSTEM FOR SPADE TERMINAL", 2nd International Conference on Digital Satellite Communication, Paris (FRANCE), Nov. 28-30, 1972 pp. 127-143.

(2) John G. Puente et al: "Multiple-Access Techniques for Commercial Satellites", *PROCEEDINGS OF THE IEEE,* Vol. 59, No. 2, pp. 218-229, Feb. 1, 1971.

(3) C. J. Wolejsza, Jr. et al: "PSK MODEMS FOR SATELLITE COMMUNICATIONS", *INTELSAT-/IEE International Conference on Digital Satellite Communication,* pp. 127-143, Nov. 25-27, 1969.

SUMMARY OF THE INVENTION

The present invention has for its object the provision of a single-channel-per-carrier multiple-access communication system which is free from the disadvantages previously encountered as described above, including a voice-activated transmission power control arranged not to cut off the transmission power output but to impart thereto a predetermined attenuation to form a definite minute power output when there is no signal input to the channel.

According to the present invention, a single-channel-per-carrier multiple-access communication system is provided in which a plurality of carriers arranged closely and each modulated by a separate channel signal are utilized on a frequency multiple basis. The communication system is characterized in that it comprises connection control means for controlling the modulator section of each channel so as to send out the carrier wave when the channel is in connection and not to send out the carrier wave when the channel is out of connection, detector means for detecting the channel signal when it is input to the channel, and level controller means operable under control of the output of the detector means to impart to the carrier wave a predetermined attenuation when the channel is in connection and has no channel signal input thereto.

The present invention will next be described in further detail with reference to the accompanying drawings.

BRIEF DESCRIPTION OF THE DRAWINGS

In the drawings, FIG. 1 is a block diagram illustrating a modulator section of a conventional SPADE system;

FIGS. 2A-2E are diagrams illustrating waveforms appearing at respective locations in FIG. 1;

FIG. 3 is a block diagram similar to FIG. 1, illustrating one embodiment of the modulation section of the present invention;

FIGS. 4A-4E are diagrams illustrating waveforms at respective locations in FIG. 3.

FIG. 5 is a block diagram illustrating a second embodiment of the modulation section of the present invention;

FIG. 6 is a block diagram showing third embodiment of the modulation section of the present invention; and FIG. 7 is a block diagram illustrating forth embodiment of the modulation section of the present invention.

DESCRIPTION OF THE PREFERRED EMBODIMENT

In order to simplify an understanding of the invention, description will first be made of a conventional system prior to describing the preferred embodiment illustrated.

FIG. 1 illustrates in block diagram the modulator section of a conventional channel unit in a digital-modulation SPADE system.

FIG. 2 illustrates waveforms at respective points in FIG. 1. In FIG. 1, voice input signal 101 (FIG. 2B) is encoded at an encoder 1 (which may include a scrambler) and code-translated at a modulator 2 for phase modulation of carrier wave 102. The modulator output signal 103 (FIG. 2D) is directed through a gate circuit 3 as a modulated carrier signal 106 (FIG. 2E) to a transmitter and transmitted therefrom after frequency conversion. A voice signal detector 4 detects the presence or absence of voice input signal 101 and produces a voice activation signal 104 (FIG. 2C) which is "1" in the presence of the voice input and "0" in the absence thereof. The detector output, i.e., voice activation signal 104 is applied to an AND gate 7 whose remaining input receives a channel connection signal 105 (FIG. 2A) which is "1" for channel connection and "0" for nonconnection. As shown, the AND output is used to control the gate circuit 3.

Thus, the output signal 103 of modulator 2 is continuous, as shown in FIG. 2D, and is controlled by the gate circuit 3 so that the transmitter input (the output of gate circuit 3) takes the form of a burst signal, as shown in FIG. 2E. Any signal leakage from the gate circuit 3 during nonconnection periods of the channel tends to adversely affect other neighboring channels and should be reduced to a minimum, for example, to the order of 45 dB. This is disadvantageous in that it necessitates complicated circuit structure and adjustment. Further, when there is no voice input, synchronization is lost at the receive end which is receiving no carrier waves. This makes it necessary to repeat carrier synchronization and recovery for each burst and, in order to avoid the front-end mutilation of a speech signal, measures, such as of reducing the sync recovery time of the demodulator and of imparting a delay to the voice signal, are required. This disadvantageously complicates the design and circuit structure of the demodulator.

Reference will next be had to FIG. 3, which illustrates the modulator section of a single-channel-per-carrier multiple-access system embodying the present invention and FIGS. 4A-4E, which illustrate waveforms taken at different points in FIG. 3. The circuit of FIG. 3 includes, in addition to the same arrangement of encoder 1, modulator 2, voice signal detector 4 and AND gate 7 as in FIG. 1, a gate circuit 5 inserted on the carrier input side of modulator 2 and controllable by the channel connection signal 105 and a level controller 6 inserted in the output of modulator 2. The level controller 6 operates under control of voice activation signal 104 to attenuate the modulator output signal 107 to a predetermined value (for example, 20 dB, a value at least effective to maintain carrier synchronization at the receiver end or a value effective also to maintain both bit and frame synchronizations) in the absence of voice input signal 101 and to allow the modulator output signal 107 to freely pass in the presence of voice input signal 101.

FIG. 4A represents the channel connection signal 105; FIG. 4B represents the voice input signal 101; FIG. 4C represents the voice activation signal 104; FIG. 4D represents the modulator output signal 107; and FIG. 4E represents the waveform of modulated carrier signal 108 in the output of level controller 6.

According to the circuit arrangement of the illustrated embodiment, the modulator output signal 107 is normally produced only when the channel is in connection (or the signal 105 has "1" level), as shown in FIG. 4D. However, the modulator 2 provides, during time periods $T_{11}$, $T_{12}$ and $T_{13}$, the carrier waves which are modulated by the encoded voice signal codes. Also, it provides, during time periods $T_{01}$, $T_{02}$ and $T_{03}$, the carrier waves which are modulated by a predetermined signal code pattern (for example, 0101 ... ) or a psuedo random code pattern. The level controller 6 provides the modulated carrier waves, as shown in FIG. 4E, in response to the output (109) of the AND gate 7. That is, it provides the modulated carrier waves having a normal level during the periods $T_{11}$, $T_{12}$ and $T_{13}$, and those having a level (for example, 20 dB) lower than the normal level during the periods $T_{01}$, $T_{02}$ and $T_{03}$. Accordingly, during the connection of the channel, the modulated carrier waves are continuously transmitted to the receiver section (not shown), as shown in FIG. 4E, regardless of the presence or absence of the voice input signal 101. Therefore, in the demodulating equipment carrier recovery and bit timing synchronization can be maintained at all times without interruption. Accordingly, there occurs no front-end mutilation of the speech signal when the voice input is again started and hence there is no need of employing in the receive end demodulating equipment a signal delaying circuit which gives rise to a delay in time of signal transmission. With no delay in time caused, it will be apparent that there is no need of enabling the sync recovery circuit to operate at any especially high speed and the demodulating equipment can thus be effectively simplified in design and construction.

Though the gate circuit 5 is arranged so as to cut off the carrier input 102 as long as the channel is out of connection, there may be more or less leakage from the gate circuit 5, which produces a leak signal in the output of modulator 2. Such modulator output, however, is further attenuated and thus in fact not fed to the transmitter. This gives a further advantage that there is no need for any complicated gate circuit particularly limited in leakage.

It will be readily understood that transmission of any small power of the order of −20 dB in the absence of voice input to the channel in connection has no substantial influence upon the advantageous effects of voice activation, including the saving of satellite consumption power and the suppression of intermodulation due to saturation of the transponder.

Although, in the embodiment shown and described above, the level controller 6 which functions to impart a definite attenuation to the modulated wave is provided on the output side of the modulator 2, it can be provided on the input side of the modulator, as shown in FIG. 5, but not on the output side thereof, with the same advantageous effects in cases where the modulator is a linear modulator. Further, though in the embodiment of FIG. 3 the gate circuit 5 is arranged on the carrier wave input side of modulator 2 to serve as a connection control means for the channel, a modulator output can be cut off without use of such gate circuit 5 if the frequency synthesizer 8 of FIG. 7 is used so as to set the frequency of carrier input 102 to the modulator 2 outside of the modulator band whenever the channel is out of connection; i.e., in response to the channel connection signal 105.

In FIG. 3, the output 104 of the detector 4 in place of the signal 109 may directly be supplied to the level controller 6. In this case, the AND gate 7 can be omitted as shown in FIG. 6.

It will be obvious to those skilled in the art that the technical concept of the present invention can be successfully applied not only to demand-assign systems such as SPADE but also to preassign systems such as SCPC.

Though description has been made hereinabove in connection with digital modulation, it is to be understood that the present invention can also be applied to frequency modulation systems with the same advantageous effect of making it unnecessary to employ a complicated gate circuit of with especially low leakage.

As will be apparent from the foregoing description, the single-channel-per-carrier multiple-access communication system of the present invention is arranged so that, even in the absence of voice input, limited wave radiation is effected as long as the channel is in connection. Accordingly there is no need for use of any gate circuit of especially low leakage. Additionally in the case of a digital modulation system, demodulation equipment at the receiver end can be effectively simplified.

What is claimed is:

1. A single channel-per-carrier modulation system comprising:
    modulator means for modulation an input carrier wave in response to an input channel signal and providing a modulated carrier wave;
    detector means for detecting the presence of the input channel signal;
    gate circuit means responsive to a channel connection signal for supplying the input carrier wave to the modulator means only when the channel connection signal indicates that the associated channel is in the connection; and
    level control means responsive to at least the output of the detector means for imparting to the modulated carrier wave a predetermined attenuation when the associated channel is in connection but there is no input channel signal present, whereby the modulated carrier wave is continuously transmitted when the associated channel is in connection, regardless of the presence or absence of an input channel signal.

2. The system of claim 1, wherein a plurality of carriers each modulated by a separate channel signal are utilized on a frequency multiple basis.

3. The system of claim 5, wherein said modulator means is responsive to an input channel signal comprising a voice.

4. A single channel-per-carrier modulation system comprising:
    detector means for detecting the presence of an input channel signal;
    modulator means for modulating an input carrier wave in response to a modulating signal and providing a modulated carrier wave;
    gate circuit means responsive to a channel connection signal for supplying the input carrier wave to the modulator means only when the channel connection signal indicates that the associated channel is in connection; and
    level control means responsive to the output of the detector means for imparting to the input channel signal a predetermined attenuation when the associated channel is in connection but there is no input channel signal present, whereby the modulated carrier wave is continuously transmitted when the associated channel is in connection, regardless of the presence or absence of an input channel signal.

5. The system of claim 4, wherein the modulator means comprises a linear modulator.

6. The system of claim 4, wherein a plurality of carriers each modulated by a separate channel signal are utilized on a frequency multiple basis.

7. The system of claim 4, wherein said modulator means is responsive to an input channel signal comprising a voice.

* * * * *